(12) United States Patent
Dey et al.

(10) Patent No.: US 9,565,460 B1
(45) Date of Patent: Feb. 7, 2017

(54) DYNAMIC VIDEO CONTENT CONTEXTUALIZATION

(71) Applicant: International Business Machines Corporation, Armonk, NY (US)

(72) Inventors: Kuntal Dey, New Delhi (IN); Seema Nagar, Bangalore (IN); Roman Vaculin, Bronxville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/841,998

(22) Filed: Sep. 1, 2015

(51) Int. Cl.
| | |
|---|---|
| *H04N 21/25* | (2011.01) |
| *H04N 21/258* | (2011.01) |
| *H04N 21/2668* | (2011.01) |
| *H04N 21/235* | (2011.01) |
| *H04N 21/81* | (2011.01) |
| *H04N 21/454* | (2011.01) |
| *H04N 21/44* | (2011.01) |
| *H04N 21/45* | (2011.01) |
| *H04N 21/41* | (2011.01) |

(Continued)

(52) U.S. Cl.
CPC .......... *H04N 21/252* (2013.01); *H04N 21/235* (2013.01); *H04N 21/25891* (2013.01); *H04N 21/2668* (2013.01); *H04N 21/40* (2013.01); *H04N 21/41* (2013.01); *H04N 21/422* (2013.01); *H04N 21/42201* (2013.01); *H04N 21/44* (2013.01); *H04N 21/44016* (2013.01); *H04N 21/44029* (2013.01); *H04N 21/45* (2013.01); *H04N 21/454* (2013.01); *H04N 21/4508* (2013.01); *H04N 21/4532* (2013.01); *H04N 21/812* (2013.01)

(58) Field of Classification Search
CPC ................................................. H02N 21/4532
See application file for complete search history.

(56) References Cited

U.S. PATENT DOCUMENTS

| | | |
|---|---|---|
| 8,666,226 B1 | 3/2014 | Kalish et al. |
| 8,726,312 B1 | 5/2014 | Hewinson |

(Continued)

FOREIGN PATENT DOCUMENTS

EP    2212843 A2    8/2010

OTHER PUBLICATIONS

Apple, "Final Cut Pro X Unprecedented power for the next generation of post", https://www.apple.com/final-cut-pro/, Accessed on Mar. 13, 2015, pp. 1-3.

(Continued)

*Primary Examiner* — Justin Shepard
(74) *Attorney, Agent, or Firm* — L. Jeffrey Kelly

(57) ABSTRACT

A method includes identifying, by a communication device, an audience including one or more viewers, generating a preference profile for the audience, correlating the generated preference profile to one or more social profiles, determining, based on the generated preference profile, the one or more social profiles, and a database of social influencers, a contextual influence, the contextual influence identifies and quantifies a possible reaction of the audience to a video content, computing a plurality of potential video advertisements from a plurality of video templates, the computing is based on the determination of the contextual influence, and ranking the computed plurality of potential video advertisements according to the contextual influence.

14 Claims, 7 Drawing Sheets

(51) Int. Cl.
*H04N 21/40* (2011.01)
*H04N 21/422* (2011.01)
*H04N 21/4402* (2011.01)

(56) References Cited

U.S. PATENT DOCUMENTS

| | | |
|---|---|---|
| 2010/0023863 A1 | 1/2010 | Cohen-Martin |
| 2012/0310717 A1* | 12/2012 | Kankainen ............ G06Q 30/02 705/14.4 |
| 2013/0161381 A1* | 6/2013 | Roundtree ......... G06Q 30/0207 235/375 |
| 2013/0195429 A1 | 8/2013 | Fay et al. |
| 2014/0108145 A1 | 4/2014 | Patel et al. |

OTHER PUBLICATIONS

Apple, "iMovie for Mac a major production. Without the major production.", Apple—iMovie for Mac, http://www.apple.com/mac/imovie/, Accessed on Mar. 13, 2015, pp. 1-7.

"Accelerate Customer Engagement", Idomoo Personalized Videos, Videos that get personal, http://idonnoo.com, Accessed on Mar. 13, 2015, pp. 1-5.

Impossible Software, "Documentation, Guides, Tools, SDKs & Examples", https://www.impossiblesoftware.com/documentation/, Accessed on Mar. 13, 2015, pp. 1-2.

Jibjab, "We Make Things That Make People Laugh", http://www.jibjab.com, Accessed on Mar. 13, 2015, pp. 1-7.

Mell et al., "The NIST Definition of Cloud Computing", Recommendations of the National Institute of Standards and Technology, U.S. Department of Commerce, Special Publication 800-145, Sep. 2011, pp. 1-7.

Rocchi et al., "Template-based Adaptive Video Documentaries", Journal: Artificial Intelligence in Mobile Systems, 2004, pp. 1-5.

Eyeview, "Unique Vertical-Focused Solutions", http://www.eyeviewdigital.com/solution-overview/, Accessed on Mar. 13, 2015, pp. 1-4.

Sullivan, "The SmartVideo Blog" Retailer's Customer Satisfaction Hinges on Data-Driven Marketing, http://info.sundaysky.com/blog/, Mar. 10, 2015, pp. 1-6.

* cited by examiner

DYNAMIC VIDEO CONTENT CONTEXTUALIZATION

BACKGROUND

The present invention generally relates to contextual computing and more particularly to real time contextualization of videos based on video templates and entity recognition.

The ability to dynamically create or adapt appropriate personalized video content in a contextually sensitive manner is becoming increasingly important in areas such as advertising. Since a wide variety of sensor-enabled devices are currently available, information about an individual audience may be collected and analyzed in a real-time fashion. This may provide an environment in which video advertisements may be generated to target an audience including a plurality of viewers in a highly personalized way.

SUMMARY

According to an embodiment of the present disclosure, a method may include: identifying, by a communication device, an audience including one or more viewers, generating a preference profile for the audience, correlating the generated preference profile to one or more social profiles, determining, based on the generated preference profile, the one or more social profiles, and a database of social influencers, a contextual influence, the contextual influence identifies and quantifies a possible reaction of the audience to a video content, computing a plurality of potential video advertisements from a plurality of video templates, the computing is based on the determination of the contextual influence, and ranking the computed plurality of potential video advertisements according to the contextual influence.

According to another embodiment of the present disclosure, a computer system for dynamic contextualization of video content may include: one or more processors, one or more computer-readable memories, one or more computer-readable tangible storage devices, and program instructions stored on at least one of the one or more storage devices for execution by at least one of the one or more processors via at least one of the one or more memories, the computer system is capable of performing a method including identifying, by a communication device, an audience including one or more viewers, generating a preference profile for the audience, correlating the generated preference profile to one or more social profiles, determining, based on the generated preference profile, the one or more social profiles, and a database of social influencers, a contextual influence, the contextual influence identifies and quantifies a possible reaction of the audience to a video content, computing a plurality of potential video advertisements from a plurality of video templates, the computing is based on the determination of the contextual influence, and ranking the computed plurality of potential video advertisements according to the contextual influence.

According to another embodiment of the present disclosure, a computer program product for dynamic contextualization of video content may include: a computer readable non-transitory article of manufacture tangibly embodying computer readable instructions which, when executed, cause a computer to carry out a method including identifying, by a communication device, an audience including one or more viewers, generating a preference profile for the audience, correlating the generated preference profile to one or more social profiles, determining, based on the generated preference profile, the one or more social profiles, and a database of social influencers, a contextual influence, the contextual influence identifies and quantifies a possible reaction of the audience to a video content, computing a plurality of potential video advertisements from a plurality of video templates, the computing is based on the determination of the contextual influence, and ranking the computed plurality of potential video advertisements according to the contextual influence.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
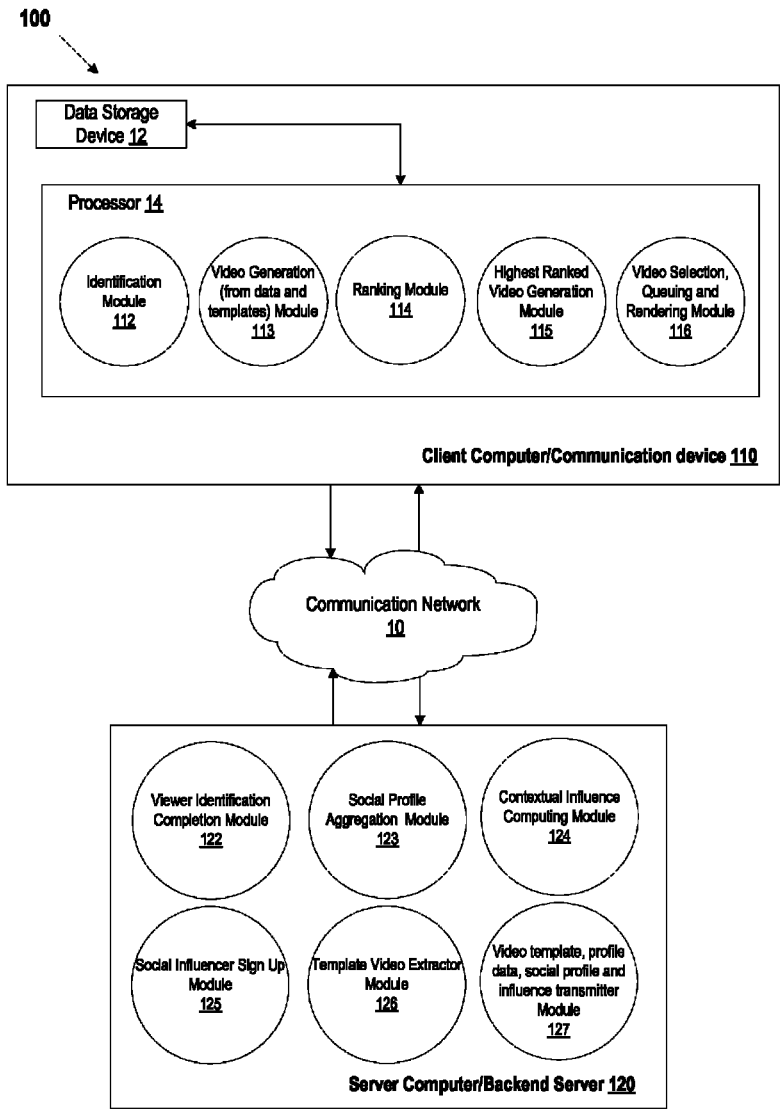
FIG. 1 is a block diagram illustrating a networked computer environment, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Dynamic generation of contextualized video content from video templates and a detected "live" context is absent from contextual computing technologies generally used in areas such as advertising. Currently, video personalization may be limited to customer data with the broadcasted video typically remaining the same (e.g. statically created video advertisement). This may cause the generated video advertisements (also referred to as "ads") to be directed either to a single person or a large audience without in-between granularity. Further, the influence of local or global trusted leaders (e.g. social influencers) on certain markets may not be quantified using current video contextualization technologies.

By dynamically generating videos in a real time fashion from existing video templates and based on a context observed in a live setting that may include a plurality of viewers, embodiments of the present disclosure may, among other potential benefits, create and deliver a single video that best suits the likes of the plurality of viewers and enable a platform for individuals to expose their profiles for generation of social-influenced video advertisement.

Embodiments of the present invention generally relate to contextual computing and more particularly to real time contextualization of videos based on video templates and entity recognition. One way to generate contextualized videos in real time may include identifying, learning or inferring the expected and/or actual set of identities (viewers) that are audience to a video at a given time; computing a set of video templates that may be possibly shown to the audience before the actual display time; creating, from the set of video templates, a ranking that may optimize the overall audience satisfaction given the audience profile (e.g. individual and social attributes) including computed influencer (social and/or individual) relationships while personalizing and contextualizing; generating a set of highly ranked videos from video templates using the given data discarding low-ranked videos; and selecting and rendering the dynamically generated video with the highest rank to the audience. One embodiment by which to dynamically contextualize video content in real time is described in detail below by referring to the accompanying drawings in FIGS. 1-7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 is depicted, according to an embodiment of the present disclosure. The networked computer environment 100 may include a client computer/communication device 110 with a data storage device 12 and a processor 14 that is enabled to run a first plurality of modules including an identification module 112, a video generation from data and templates module 113, a ranking module 114, a highest ranked video generation module 115, and a video selection, queuing and rendering module 116 for real time contextualization of video content.

The networked computer environment 100 may also include a server computer/backend server 120 that is enabled to run a second plurality of modules including a viewer identification completion module 122, a social profile aggregation module 123, a contextual influence computing module 124, a social influencer sign up module 125, a template video extractor module 126, and a video template, profile data, social profile and influence transmitter module 127. The client computer/communication device 110 may communicate with the server computer/backend server 120 via the communication network 10. The communication network 10 may include connections, such as wire, wireless communication links, or fiber optic cables. In one exemplary embodiment, the communication network 10 may include a socket port using an internet protocol. The communication network 10 may include various types of communication networks, such as a wide area network (WAN), local area network (LAN), a telecommunication network, a wireless network, a public switched network and/or a satellite network.

As will be discussed below with reference to FIG. 5, the client computer/communication device 110 may include internal components 502a and external components 504a, respectively and the sever computer/backend server 120 may include internal components 502b and external components 504b, respectively. The client computer/communication device 110 may be, for example, a TV, a set-top box, a digital media player (DMP), a mobile device, a telephone, a PDA, a netbook, a laptop computer, a tablet computer, a desktop computer, or any type of computing device capable of running a program and accessing a network. The server computer/backend server 120 may be, for example, a server, a video provider, or a cable provider.

It should be noted that the networked computer environment 100 may include a plurality of client computer/communication devices 110 and a plurality of server computer/backend servers 120, however only one of which is shown for illustrative brevity. It may be appreciated that FIG. 1 provides only an illustration of one implementation and does not imply any limitations with regard to the environments in which different embodiments may be implemented. Many modifications to the depicted environments may be made based on design and implementation requirements.

Figure 2:
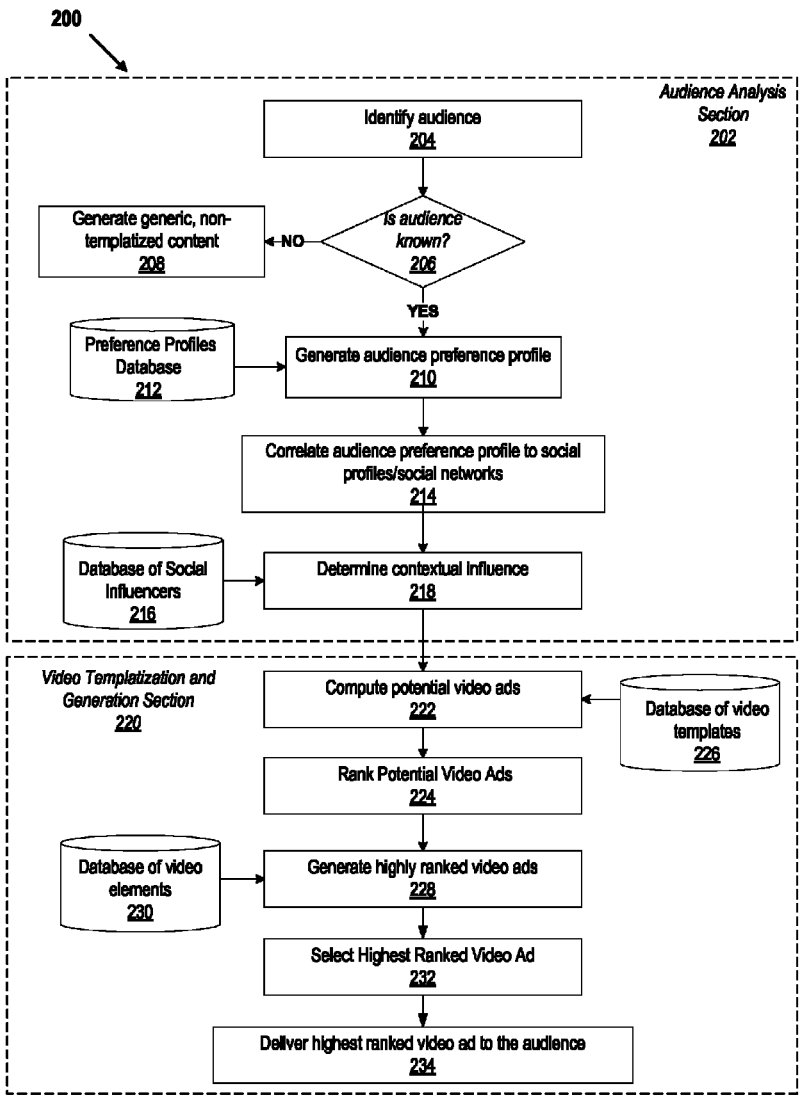
FIG. 2 is a flowchart depicting processing steps for generation of dynamically contextualized video content, according to an embodiment of the present disclosure.

Referring now to FIG. 2, a flowchart 200 illustrating the steps to dynamically generate contextualized video content is shown, according to an embodiment of the present disclosure. The process of creating a dynamic contextualized video described in the flowchart 200 may include an audience analysis section 202 and a video templatization and generation section 220. The audience analysis section 202 may generally be performed prior to the video templatization and generation section 220.

The audience analysis section 202 may start at step 204, in this step the client computer/communication device 110 (hereinafter "communication device") shown in FIG. 1 may, at least partially, recognize an audience. The audience may include one or more viewers as will be described in detailed below.

If the communication device 110 (FIG. 1) recognizes the one or more viewers in the audience, information regarding identity, likes, social profiles etc. may be collected by, for example, the identification module 112 (FIG. 1). The information collected by the communication device 110 (FIG. 1) may be completed at 212 by integrating information from a preference profiles database (e.g. audience preferences and likes) to generate or determine a preference profile for the audience at 210. In one embodiment, the described steps 210, 212 may be carried in, for example, the viewer identification completion module 122 (FIG. 1).

It should be noted that if the audience is not recognized by the communication device 110 (FIG. 1) at 206, a generic, non-templatized content may be provided at 208 to generate a non-personalized video advertisement.

At 214 the audience preference profile may be correlated with a plurality of social profiles/social networks to capture and rank or score data attributed to a person's social profiles, such as, for example, Facebook® (Facebook and all Facebook-based trademarks and logos are trademarks or registered trademarks of Facebook and/or its affiliates, LinkedIn® (LinkedIn and all LinkedIn-based trademarks and logos are trademarks or registered trademarks of LinkedIn and/or its affiliates and Twitter® (Twitter and all Twitter-based trademarks and logos are trademarks or registered trademarks of Twitter and/or its affiliates).

Then, at 216, a database of social influencers may be used to determine a contextual influence for the audience at 218. The contextual influence may identify and quantify a possible reaction of the audience to a video content. It may be understood to those skilled in the art that the determined contextual influence may emphasize the content and context of the information collected about the audience. More specifically, contextual influence measurement tools may be used (for example, in the contextual influence computing module 124 shown in FIG. 1) to identify and quantify who may have an influence in a particular topic, subject or market, and, in consequence, have a greater impact on a particular audience.

According to the generated audience preference profile, the contextual influence may be determined by looking at all public data available to determine who a potential influencer to the audience may be. In one embodiment, the described steps 214, 216, and 218 may be executed in the social profile aggregation module 123, the contextual influence computing module 124, and the social influencer sign up module 125, respectively.

With the determination of the contextual influence at 218, the audience analysis section 202 may be completed, then at 222 the video templatization and generation section 220 may begin by computing a plurality of potential video advertisements which may be based on a plurality of video ad templates available from a database of video templates at 226. In some embodiments, the database of video templates at 226 may be provided by, for example, an advertising company (advertiser) as will be described in detailed below.

It should be noted that the video templates in the database of video templates at 226 may be selected based on a probability of influencing the audience and the selected video templates at 222 may include a match to the determined contextual influence at 218.

The plurality of potential video ads may be subsequently ranked at 224 according to the determined contextual influence (step 218) in, for example, the ranking module 114 (FIG. 1). Based on the video ranking performed at 224, video ads from the plurality of potential video advertisements with the highest rank may be integrated with a database of video elements at 230 to generate a plurality of highly personalized video advertisements at 228. The database of video elements at 230 may contain additional information about the audience social relationships or circles which may help to further tailor the video advertisements to the audience's preferences and the determined contextual influence.

For example, given a generic video template in which a person A advertises a product X. From the audience analysis section 202, it is detected that in the social network or social circle of a first viewer, a person B is an influencer (influencer B) while in the social network of a second viewer, a person C is an influencer (influencer C). To generate a personalized video advertisement of the product X, the database of video elements 230 may provide video templates including influencers B and C, such that in the video advertisement rendered to the first viewer the person A in the generic video template is substituted by the influencer B, while in the case of the second viewer the person in the generic video template is substituted by the influencer C.

Next at 232, the potential video advertisements with the highest rank may be selected to be delivered or rendered to the audience at 234. In one embodiment, the described steps 232 and 234 may take place at the highest ranked video generation module 115 (FIG. 1) and the video, selection, queuing and rendering module 116 (FIG. 1).

Figure 3:
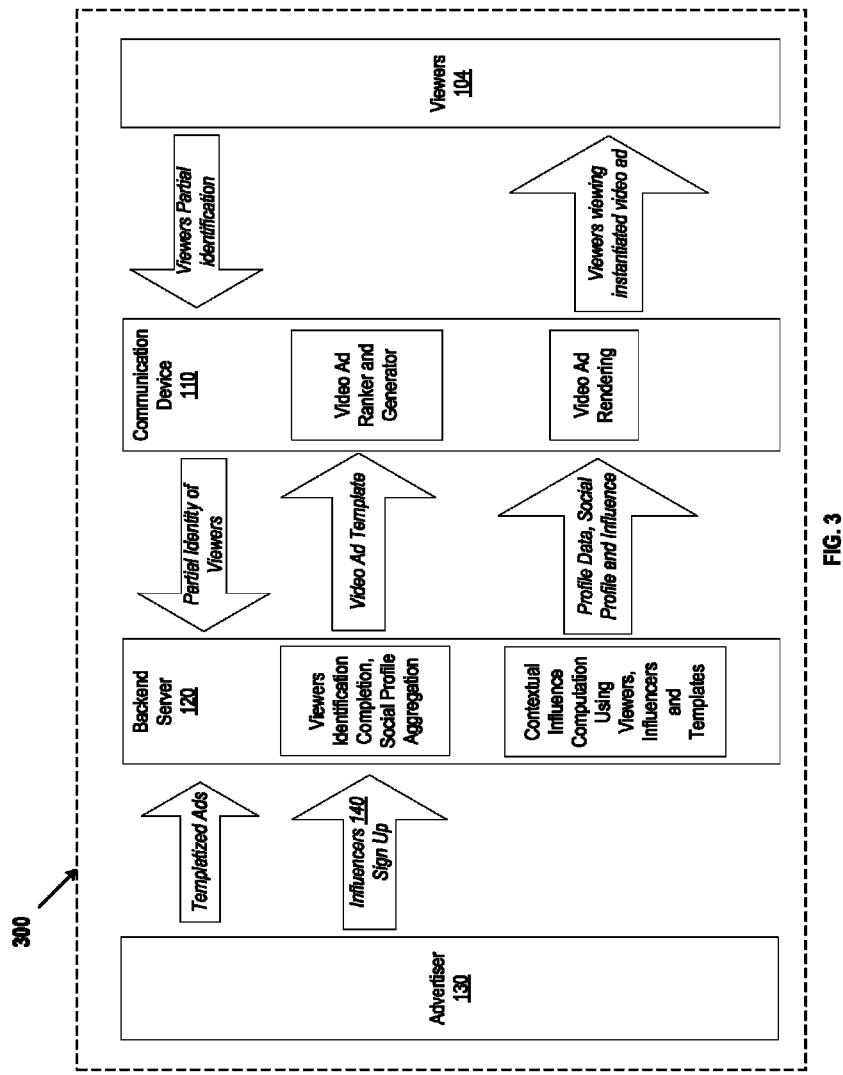
FIG. 3 is an exemplary workflow for dynamic contextualization of video content, according to an embodiment of the present disclosure.

Referring now to FIG. 3, an exemplary workflow 300 for real time dynamic contextualization of video content is shown, according to an embodiment of the present disclosure. In this embodiment, the audience may consist of one or more viewers 104 (hereinafter "viewers") that may interact with the communication device 110.

For illustration purposes only, without intent of limitation, only one communication device 110 is shown in the Figures, however one or more communication devices 110 with their corresponding set of viewers 104 may be contemplated. It should be noted that the one or more communication devices 110 may exist in different locations. For example, a communication device 110 including a TV may have an audience E located in a country Y, while another communication device 110 including a laptop computer may have an audience F located in a country Z.

Using existing technologies, the communication device 110 may be capable of recognizing the viewers 104 and, at least partially, associating their identities to a variety of information regarding the viewers 104 personal history that may be contained in the communication device 110. The collected information may then be transmitted to the backend server 120 in which identification of the viewers 104 may be completed by, for example, matching the viewers 104 to a social network account so that accurate information about the viewers 104 personal history may be expanded. Subsequently, a plurality of video templates may be sent to the backend server 120 from an advertiser 130 based on the information obtained about the viewers 104 in the communication device 110 and the backend server 120.

It should be noted that a plurality of social influencers 140 (hereinafter "social influencers") may be chosen based on the data from the viewers 104 (e.g. likes, religious and/or political views, etc.) collected by the communication device 110 and further completed in the backend server 120. Information about social influencers 140 may further narrow the audience for a given video advertisement and may, in some embodiments, be chosen as the main character of the rendered video.

As described above, the plurality of video templates (hereinafter "video templates" or "templates") may be selected according to the information about the viewers 104 (profile data, social profiles and contextual influence) by means of a video ad ranker and generator as previously described. It should also be noted that the process of ranking and selecting the video templates may be known to those skilled in the art and may include computing a set of potential video templates that may suit the audience likes. According to the collected information about the viewers 104 and the video ranking, the video with the highest rank may be chosen from the ranked set of potential video templates to be instantly delivered to the viewers 104.

Exemplary embodiments of the proposed dynamic contextualization of videos may include, but are not limited to: 1) movies including different segments pre-identified in form of metadata (time zone, localization, take number, name of the clip, etc.) and a few alternative data delivery instances that may be shown to different audience segments (including groups and individuals) in different forms; 2) advertisements, such as online video ads and television commercials which may be contextualized by dynamic production before being actually rendered; 3) educational videos which may use a known teacher's face and voice to explain certain facts whenever a human is shown.

Figure 4:
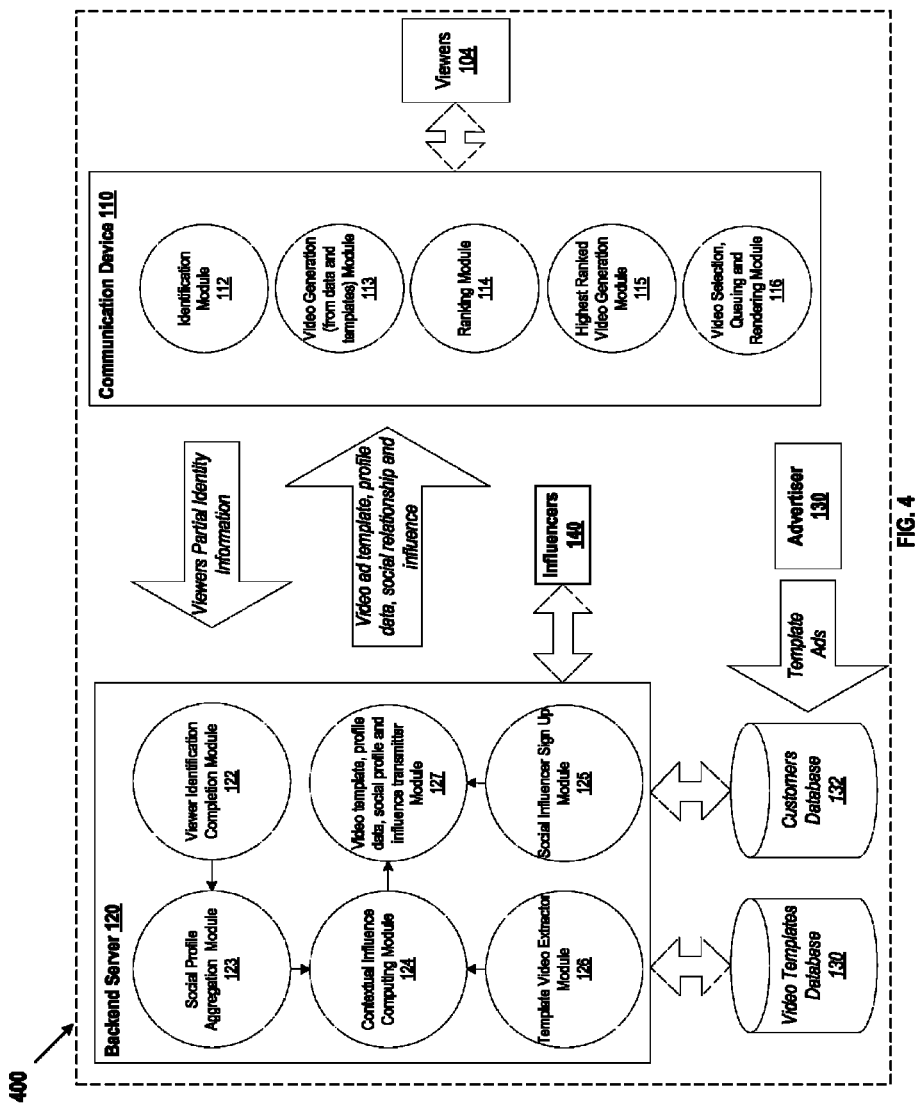
FIG. 4 illustrates an exemplary system architecture for dynamic contextualization of video content, according to an embodiment of the present disclosure.

Referring now to FIG. 4, an exemplary system architecture 400 required for real-time generation of dynamically contextualized videos is shown, according to an embodiment of the present disclosure. In this embodiment, the communication device 110 may include the identification module 112, the video generation from data and templates module 113, the ranking module 114, the highest ranked video generation module 115, and the video selection, queuing and rendering module 116 as described above with reference to FIG. 1.

The identification module 112 may recognize the viewers 104 and transfer the collected information to the backend server 120. Recognition of the viewers 104 in the identification module 112 may include existing technologies which may combine outcomes of well-known instruments and algorithms to identify, learn or infer the expected or actual set of entities (e.g. viewers 104) that may be audience to a video at a given time.

In one embodiment identification of the viewers 104 may be biometric based including, for example, eyeball, voice, and/or fingerprint recognition. In another embodiment, the viewers 104 identity may be inferred by, for example, a physical address, an IP address, concurrent online participation etc. In yet another embodiment, the viewers 104 identity may be learned from a given history such as prior watching history, statistical attributes, demographic likelihood etc.

The collected identity data may be analyzed at the backend server 120 where various video templates may be chosen and sent to the video generation module 113 of the communication device 110 as will be described in detail below. The video generation module 113 may generate a variety of videos whose content may be the most appropriate for the viewers 104. The video generation module 113 may integrate data from the identification module 112 and the video templates selected by the backend server 120 to generate a set of potential videos to be delivered to the viewers 104. The generated set of potential videos may be tailored according to the collected information about the viewers 104. The generated set of potential videos may integrate different audio-visual characters (e.g. narrator, voiceover etc.) and video snippets dynamically created from the video templates in the communication device 110.

It should be noted that the different video snippets and audio-visual characters may be identified based on the probability of influencing the identified audience.

The generated set of potential videos may then be classified in the ranking module 114 in a way such that only those videos which may have the strongest impact or influence on the viewers 104 may be picked by the video generation module 115 to be created. Here it should be noted that the ranking may be substantially based on the highest probability of the generated set of potential videos influencing the audience combined with how well the content may match the audience's preferences.

Subsequently, in the video selection, queuing and rendering module 116, the video from the set of potential videos with the highest rank (e.g. highest likelihood of influencing the audience) may be selected and delivered to the viewers 104. At this point lower ranked videos may be discarded. In some embodiments, the lower ranked videos may be saved for use in subsequent advertisements.

In the backend server 120, a viewer identification completion module 122 may send the information received from the identification module 112 in the communication device 110 to a social profile aggregation module 123. In the social profile aggregation module 123 additional information about the viewers 104 may be obtained, including for example, likes, hobbies, potential influencers' identity etc. At the contextual influence computing module 124, a template may be received from a template video extractor module 126 to be personalized based on the obtained information about the viewers 104 likes. It should be noted that, if the social influencers 140 have been recognized at the social profile aggregation module 123, they may participate via the social influencer sign up module 125 to further personalize the video ad templates from the template video extractor 126. In a video template, profile data, social profile and influence transmitter module 127 the video templates that may suit the viewers 104 may be send to the video generation module 113 in the communication device 110 to execute the functions described above.

The described template-based video generation methodology may facilitate a platform for individuals to expose their profiles for social influenced based video advertisement (influencer marketing) in the given context (audience, location, etc.) which concentrates on the viewers 104 likes rather than a target market as a whole. In some embodiments, the video advertisements may be produced around the social influencers 140, which may be paid for exposing their profiles.

With continued reference to FIG. 4, the plurality of video templates from the advertiser 130 may be send to a database of video templates 134 which may be in connection with a database of customers 132 including the viewers 104 identity, history and social relationships.

It should be noted that, in the system architecture 400, one or more variations may be contemplated based upon specific embodiments, domain, performance requirements, device capability estimation, etc. For example, in one embodiment, the video generation module 113 may operate in the backend server 120 and may send the generated video templates to the ranking module 114 running in the communication device 110. For example, in another embodiment, both the video generation module 113 and the ranking module 114 may be run in the backend server 120, the generated and ranked videos may then be transmitted to the communication device 110.

It should also be noted that in some embodiments a mixed (hybrid) mode may be used for better performance. More specifically, if the performance of the communication device 110 is known, depending on the computing power of the device, hybrid combinations may or may not be implemented. For example, in embodiments in which the communication device 110 is a laptop computer (higher computing power), both the video generation module 113 and the ranking module 114 may run in the communication device 110. For example, in embodiments in which the communication device 110 is a set-top box, the video generation module 113 may operate in the backend server 120 and may send the generated video templates to the ranking module 114 running in the communication device 110. For example, in embodiments in which the communication device 110 is a mobile device, both the video generation module 113 and the ranking module 114 may run in the backend server 120 and the generated videos may be sent to the communication device 110.

A mix of all of the previously described configurations may be used in order to split the processing across one or more backend servers and one or more communication devices even for a shared video advertisement since it may reduce a server load without degrading the audience viewing experience.

Figure 5:
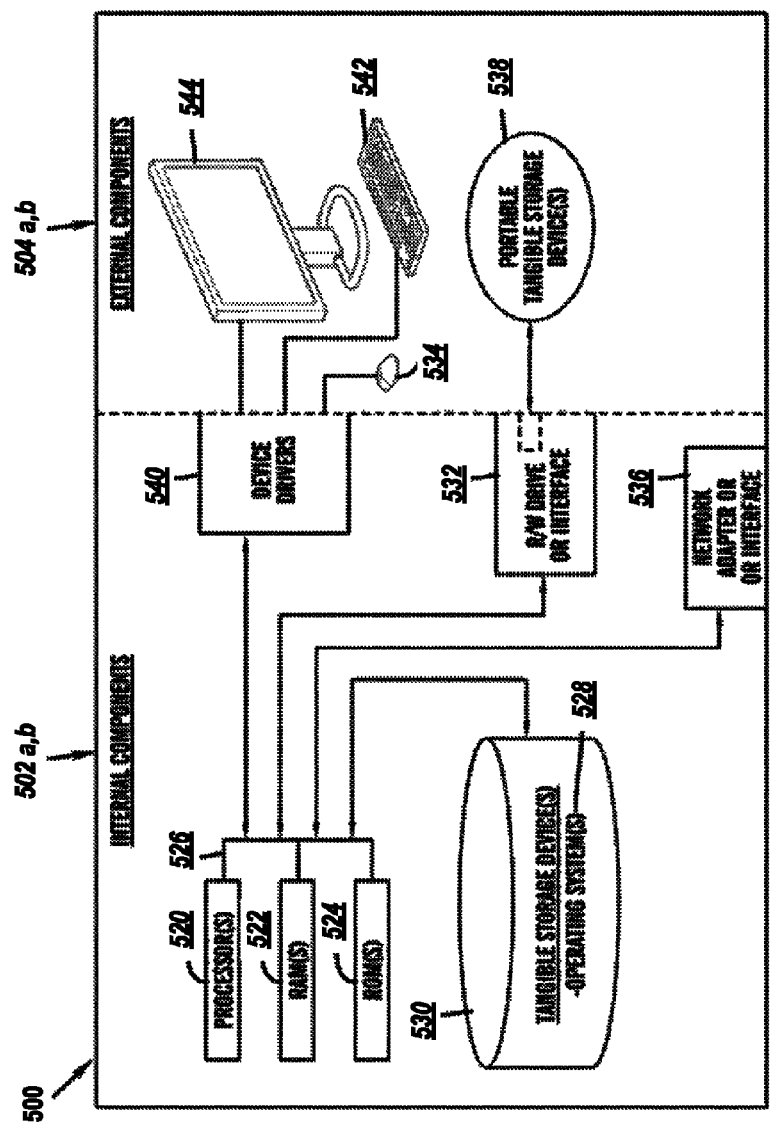
FIG. 5 is a block diagram of internal and external components of computers and servers depicted in FIG. 1, according to an embodiment of the present disclosure.

Referring now to FIG. 5, a block diagram 500 of internal and external components of computers depicted in FIG. 1 is shown according to an embodiment of the present disclosure. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 502, 504 is representative of any electronic device capable of executing machine-readable program instructions. Data processing system 502, 504 may be representative of a smart phone, a computer system, PDA, or other electronic devices. Examples of computing systems, environments, and/or configurations that may be represented by data processing system 502, 504 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computer/communication device 110 (FIG. 1) and server computer/backend server 120 (FIG. 1) may include respective sets of internal components 502 a,b and external components 504 a,b illustrated in FIG. 5. Each of the sets of internal components 502 include one or more processors 520, one or more computer-readable RAMs 522 and one or more computer-readable ROMs 524 on one or more buses 526, and one or more operating systems 528 and one or more computer-readable tangible storage devices 530. The first plurality of modules (the identification module 112, the video generation from data and templates module 113, the ranking module 114, the highest ranked video generation module 115, and the video selection, queuing and rendering module 116 for real time contextualization of video content) in client computer/communication device 110 (FIG. 1) and the second plurality of modules (the viewer identification completion module 122, the social profile aggregation module 123, the contextual influence computing module 124, the social influencer sign up module 125, the template video extractor module 126, and the video template, profile data, social profile and influence transmitter module 127) in the server computer/backend server 120 (FIG. 1) are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. Software programs, such as the first and second plurality of modules described above can be stored on one or more of the respective portable computer-readable tangible storage devices 538, read via the respective R/W drive or interface 532 and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The first plurality of modules (the identification module 112, the video generation from data and templates module 113, the ranking module 114, the highest ranked video generation module 115, and the video selection, queuing and rendering module 116 for real time contextualization of video content) in client computer/communication device 110 (FIG. 1) and the second plurality of modules (the viewer identification completion module 122, the social profile aggregation module 123, the contextual influence computing module 124, the social influencer sign up module 125, the template video extractor module 126, and the video template, profile data, social profile and influence transmitter module 127) in the server computer/backend server 120 (FIG. 1) can be downloaded to the client computer/communication device 110 (FIG. 1) and server computer/backend server 120 (FIG. 1) from an external computer via a network (for example, the Internet, a local area network or other, wide area network) and respective network adapters or interfaces 536. From the network adapters or interfaces 536, the first plurality of modules (the identification module 112, the video generation from data and templates module 113, the ranking module 114, the highest ranked video generation module 115, and the video selection, queuing and rendering module 116 for real time contextualization of video content) in client computer/communication device 110 (FIG. 1) and the second plurality of modules (the viewer identification completion module 122, the social profile aggregation module 123, the contextual influence computing module 124, the social influencer sign up module 125, the template video extractor module 126, and the video template, profile data, social profile and influence transmitter module 127) in the server computer/backend server 120 (FIG. 1) are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542 and computer mouse 534. The device drivers 540, R/W drive or interface 532 and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
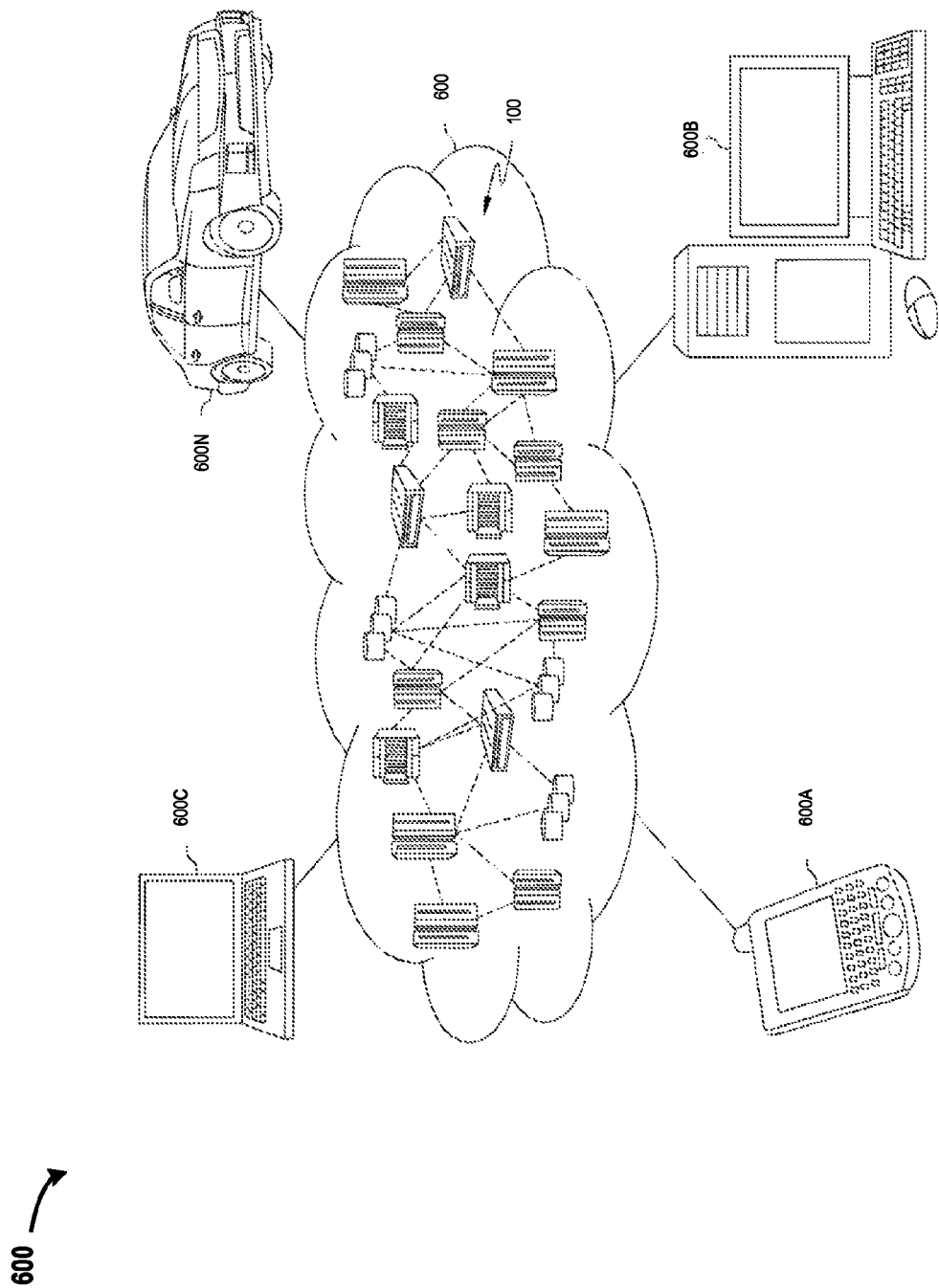
FIG. 6 is a block diagram of an illustrative cloud computing environment including the computer system depicted in FIG. 1, according to an embodiment of the present disclosure.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
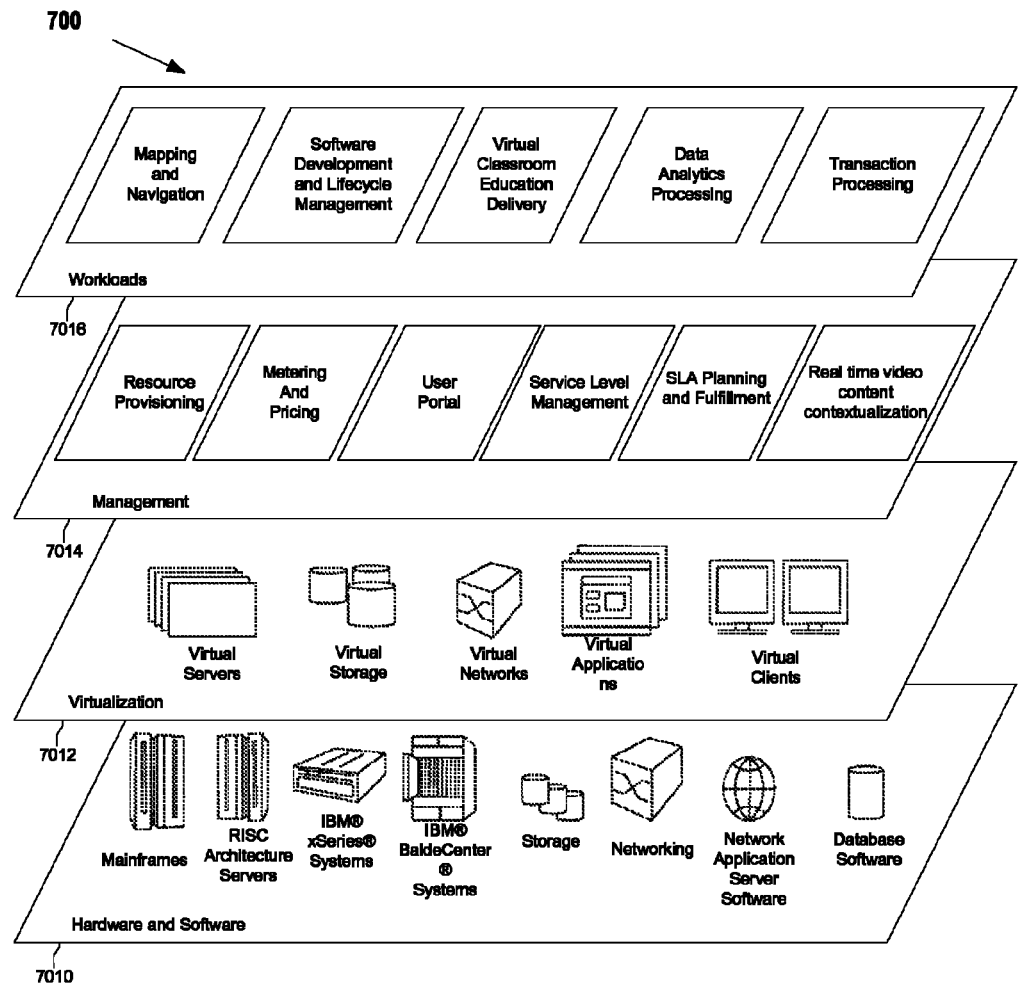
FIG. 7 is a block diagram of functional layers of the illustrative cloud computing environment of FIG. 6, according to an embodiment of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 7010 includes hardware and software components. Examples of hardware components include: mainframes; RISC (Reduced Instruction Set Computer) architecture based servers; storage devices; networks and networking components. In some embodiments, software components include network application server software.

Virtualization layer 7012 provides an abstraction layer from which the following examples of virtual entities may be provided: virtual servers; virtual storage; virtual networks, including virtual private networks; virtual applications and operating systems; and virtual clients.

In one example, management layer 7014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A program for real time video content contextualization may generate dynamically contextualized video advertisements based on video templates and entity recognition.

Workloads layer 7016 provides examples of functionality for which the cloud computing environment may be utilized.

Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
   recognizing, by a first communication device, a first viewer;
   recognizing, by a second communication device, a second viewer, wherein the first viewer and the second viewer comprise an audience to a video advertisement;
   generating a preference profile for the first viewer and a preference profile for the second viewer, wherein the preference profile for the first viewer and the preference profile for the second viewer comprise personal preferences and likes stored in the first communication device and the second communication device respectively;
   augmenting the generated preference profile for the first viewer and the generated preference profile for the second viewer with content associated with a social media profile of the first viewer and a social media profile of the second viewer;
   determining, based on the generated preference profile for the first viewer and the generated preference profile for the second viewer, a first social influencer associated with the generated preference profile for the first viewer and a second social influencer associated with the generated preference profile for the second viewer, wherein the first social influencer and the second social influencer cause a reaction from the first viewer and the second viewer to the video advertisement;
   selecting, from a database of video templates, at least one video template that matches the generated preference profile for the first viewer and at least one video template that matches the generated preference profile for the second viewer,
   wherein the at least one video matching the generated preference profile for the first viewer comprises the first social influencer, and
   wherein the at least one video matching the generated preference profile for the second viewer comprises the second social influencer,
   generating, in real time, the video advertisement based on the at least one video matching the generated preference profile for the first viewer and the at least one video matching the generated preference profile for the second viewer; and
   simultaneously rendering the video advertisement to the first viewer via the first communication device and to the second viewer via the second communication device, wherein the video advertisement rendered to the first viewer comprises the first social influencer and the video advertisement rendered to the second viewer comprises the second social influencer.

2. The method of claim 1, wherein the generated preference profile for the first viewer and the generated preference profile for the second viewer comprises a contextual influence that enables a platform for individuals to expose their profiles for generation of a social-influenced video advertisement.

3. The method of claim 1, further comprising:
   generating one or more video advertisements from the database of video templates, wherein the generated one or more video advertisements comprise video advertisements capable of influencing the audience according to the generated preference profile for the first viewer and the generated preference profile for the second viewer;
   ranking the generated one or more video advertisements based on a match between the generated one or more video advertisements and the generated preference profile for the first viewer and the generated preference profile for the second viewer;
   selecting, from the ranked video advertisements, a video advertisement that comprises a best match to the generated preference profile for the first viewer and the generated preference profile for the second viewer; and
   rendering the video advertisement to the audience.

4. The method of claim 3, further comprising:
   storing at least one video advertisement comprising a lower rank such that the at least one video advertisement is used in a subsequent advertisement.

5. The method of claim 1, wherein generating, in real time, the video advertisement comprises:
   using a database comprising a plurality of video elements to personalized the video advertisement according to the generated preference profile for the first viewer and the generated preference profile for the second viewer.

6. A computer system for dynamic contextualization of video content, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   recognizing, by a first communication device, a first viewer;
   recognizing, by a second communication device, a second viewer, wherein the first viewer and the second viewer comprise an audience to a video advertisement;
   generating a preference profile for the first viewer and a preference profile for the second viewer, wherein the preference profile for the first viewer and the preference profile for the second viewer comprise personal preferences and likes stored in the first communication device and the second communication device respectively;
   augmenting the generated preference profile for the first viewer and the generated preference profile for the second viewer with content associated with a social media profile of the first viewer and a social media profile of the second viewer;
   determining, based on the generated preference profile for the first viewer and the generated preference profile for the second viewer, a first social influencer associated with the generated preference profile for the first viewer and a second social influencer associated with the generated preference profile for the second viewer, wherein the first social influencer and the second social influencer cause a reaction from the first viewer and the second viewer to the video advertisement;

selecting, from a database of video templates, at least one video template that matches the generated preference profile for the first viewer and at least one video template that matches the generated preference profile for the second viewer, wherein the at least one video matching the generated preference profile for the first viewer comprises the first social influencer, and wherein the at least one video matching the generated preference profile for the second viewer comprises the second social influencer, generating, in real time, the video advertisement based on the at least one video matching the generated preference profile for the first viewer and the at least one video matching the generated preference profile for the second viewer; and simultaneously rendering the video advertisement to the first viewer via the first communication device and to the second viewer via the second communication device, wherein the video advertisement rendered to the first viewer comprises the first social influencer and the video advertisement rendered to the second viewer comprises the second social influencer.

7. The computer system of claim 6, wherein the generated preference profile for the first viewer and the generated preference profile for the second viewer comprises a contextual influence that enables a platform for individuals to expose their profiles for generation of a social-influenced video advertisement.

8. The computer system of claim 6, further comprising:
generating one or more video advertisements from the database of video templates, wherein the generated one or more video advertisements comprise video advertisements capable of influencing the audience according to the generated preference profile for the first viewer and the generated preference profile for the second viewer;
ranking the generated one or more video advertisements based on a match between the generated one or more video advertisements and the generated preference profile for the first viewer and the generated preference profile for the second viewer;
selecting, from the ranked video advertisements, a video advertisement that comprises a best match to the generated preference profile for the first viewer and the generated preference profile for the second viewer; and
rendering the video advertisement to the audience.

9. The computer system of claim 8, further comprising:
storing at least one video advertisement comprising a lower rank such that the at least one video advertisement is used in a subsequent advertisement.

10. The computer system of claim 6, wherein generating, in real time, the video advertisement comprises:
using a database comprising a plurality of video elements to personalized the video advertisement according to the generated preference profile for the first viewer and the generated preference profile for the second viewer.

11. A computer program product for dynamic contextualization of video content, the computer program product comprising:

a computer readable non-transitory article of manufacture tangibly embodying computer readable instructions which, when executed, cause a computer to carry out a method comprising:
recognizing, by a first communication device, a first viewer;
recognizing, by a second communication device, a second viewer, wherein the first viewer and the second viewer comprise an audience to a video advertisement;
generating a preference profile for the first viewer and a preference profile for the second viewer, wherein the preference profile for the first viewer and the preference profile for the second viewer comprise personal preferences and likes stored in the first communication device and the second communication device respectively;
augmenting the generated preference profile for the first viewer and the generated preference profile for the second viewer with content associated with a social media profile of the first viewer and a social media profile of the second viewer;
determining, based on the generated preference profile for the first viewer and the generated preference profile for the second viewer, a first social influencer associated with the generated preference profile for the first viewer and a second social influencer associated with the generated preference profile for the second viewer, wherein the first social influencer and the second social influencer cause a reaction from the first viewer and the second viewer to the video advertisement;
selecting, from a database of video templates, at least one video template that matches the generated preference profile for the first viewer and at least one video template that matches the generated preference profile for the second viewer,
wherein the at least one video matching the generated preference profile for the first viewer comprises the first social influencer, and
wherein the at least one video matching the generated preference profile for the second viewer comprises the second social influencer,
generating, in real time, the video advertisement based on the at least one video matching the generated preference profile for the first viewer and the at least one video matching the generated preference profile for the second viewer; and
simultaneously rendering the video advertisement to the first viewer via the first communication device and to the second viewer via the second communication device, wherein the video advertisement rendered to the first viewer comprises the first social influencer and the video advertisement rendered to the second viewer comprises the second social influencer.

12. The computer program product of claim 11, wherein the generated preference profile for the first viewer and the generated preference profile for the second viewer comprises a contextual influence that enables a platform for individuals to expose their profiles for generation of a social-influenced video advertisement.

13. The computer program product of claim 11, further comprising:
generating one or more video advertisements from the database of video templates, wherein the generated one or more video advertisements comprise video advertisements capable of influencing the audience according to the generated preference profile for the first viewer and the generated preference profile for the second viewer;

ranking the generated one or more video advertisements based on a match between the generated one or more video advertisements and the generated preference profile for the first viewer and the generated preference profile for the second viewer;

selecting, from the ranked video advertisements, a video advertisement that comprises a best match to the generated preference profile for the first viewer and the generated preference profile for the second viewer; and rendering the video advertisement to the audience.

14. The computer program product of claim 11, wherein generating, in real time, the video advertisement comprises:
using a database comprising a plurality of video elements to personalized the video advertisement according to the generated preference profile for the first viewer and the generated preference profile for the second viewer.

* * * * *